United States Patent
Alexandrovich et al.

[11] Patent Number: 5,156,937
[45] Date of Patent: Oct. 20, 1992

[54] REDUCED VISCOSITY POLYESTER COMPOSITION FOR TONER POWDERS

[75] Inventors: Peter S. Alexandrovich, Rochester; John E. Derimiggio, Fairport; Joseph A. Pavlisko, Pittsford, all of N.Y.

[73] Assignee: Eastman Kodak Company, Rochester, N.Y.

[21] Appl. No.: 712,837

[22] Filed: Jun. 10, 1991

[51] Int. Cl.$^5$ .............................. G03G 9/08
[52] U.S. Cl. ................... 430/110; 430/109; 430/114; 430/904; 528/304; 528/305; 528/272
[58] Field of Search ............ 430/110, 109, 904, 114; 528/304, 305, 272; 524/306, 359, 556

[56] References Cited

U.S. PATENT DOCUMENTS

| | | |
|---|---|---|
| 3,965,021 | 6/1976 | Clemens et al. |
| 4,049,447 | 9/1977 | Azar et al. |
| 4,246,332 | 1/1981 | Tanaka et al. ............ 430/109 |
| 4,546,060 | 10/1985 | Miskinis et al. .......... 430/108 |
| 4,714,669 | 12/1987 | Pfeifer et al. ............ 430/325 |
| 4,795,689 | 1/1989 | Matsubara et al. ........ 430/99 |
| 4,812,377 | 3/1989 | Wilson .................... 430/109 |
| 4,863,824 | 9/1989 | Uchida et al. ............ 430/109 |
| 4,866,158 | 9/1989 | Kubo et al. .............. 528/272 |

FOREIGN PATENT DOCUMENTS

| | | |
|---|---|---|
| 0291059 | 11/1988 | European Pat. Off. |
| 0333498 | 9/1989 | European Pat. Off. |
| 56-065146 | 6/1981 | Japan |
| 61-176946-A | 8/1986 | Japan |
| 61-176948 | 8/1986 | Japan |
| 62-299859-A | 12/1987 | Japan |
| 01015755 | 1/1989 | Japan |

*Primary Examiner*—Marion E. McCamish
*Assistant Examiner*—Rosemary Ashton
*Attorney, Agent, or Firm*—Michael L. Goldman; Willard G. Montgomery; Alfred P. Lorenzo

[57] ABSTRACT

The present invention relates to a polymer composition comprising a high molecular weight polyester having a glass transition temperature of 50° to 100° C. and a weight average molecular weight of 30,000 to 100,000 and a low molecular weight polyester in linear, amorphous form defined by the formula:

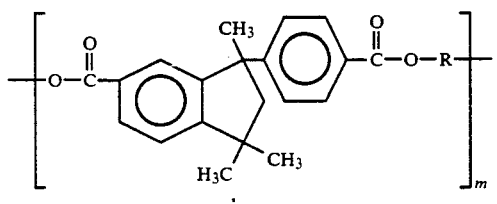

said low molecular weight polyester having a glass transition temperature of 55°–65° C., wherein:
R is a hydrocarbon radical having 2 to 5 carbons and
m is a number which gives the low molecular weight polyester a number average molecular weight of 500 to 2000.

20 Claims, No Drawings

REDUCED VISCOSITY POLYESTER COMPOSITION FOR TONER POWDERS

FIELD OF THE INVENTION

The present invention relates to a reduced viscosity polyester composition for toner powders used in electrographic processes.

BACKGROUND OF THE INVENTION

Electrography, which broadly includes the forming a developing of electrostatic image patterns either with or without light, has become a major field of technology. It perhaps is best known through the use of electrophotographic office copying machines. In electrophotographic processes, a uniform electrostatic charge is placed on a photoconductive insulating layer. The layer is then exposed to a light and shadow image to dissipate the charge on the areas of the layer exposed to light. The resulting electrostatic image is developed by depositing a toner powder on the image. The toner powder is only adherently attracted to those areas of the layer which retain a charge so that the toner image corresponds to the electrostatic image when the charging polarity is opposite that of the toner polarity. Conversely, if the toner polarity is the same as the charging polarity, exposed and thus discharged areas of the image can be toned if the potential applied to the toning assembly is higher than that of the exposed areas. The toner image is then transferred to paper to which it is permanently fused with heat.

High quality electrophotographic process color and other types of continuous toned images require use of smooth, high quality paper such as clay coated lithographic paper stock. To fuse process color images on such paper, the toner powder must include a binder with a melt viscosity substantially lower than that of binders for black and white electrophotographic copying. Such viscosity reduction is needed to achieve the desired properties of surface gloss and elimination of light scattering voids in images. At the same time, however, the toner binder must be useful at a low enough input energy or temperature so that the clay coated paper stock does not blister due to the vaporization of water within the paper.

The toner binder must also minimize offset. Offset occurs when some of the toner adheres to the paper, while some remains on the fusing roller and then bonds to the next piece of paper. Resistance to offset is normally achieved by use of a toner binder with high melt cohesive strength or high melt elasticity (e.g., polymeric toner binders which have a high molecular weight or are crosslinked).

Polyesters represent a useful class of toner binders. See, for example, U.S. Pat. No. 4,546,060 to Miskinis, et al., U.S. Pat. NO. 4,758,491 to Alexandrovich et. al., and U.S. Pat. No. 4,866,158. Amongst these, polyesters formed from the reaction of aromatic dicarboxylic acids with one or more diols have frequently been found useful bas binders in toner powder. See e.g., European Patent Application No. 291,059 to Kubo, et al. and Japanese Patent Application No. 61,176,948. In some cases, the aromatic polyester is formed from fused ring aromatic dicarboxylic acids as in U.S. Pat. No. 4,049,447 to Azar, et al., U.S. Pat. No. 4,246,332 to Tanaka et. al., and European Patent Application No. 333,498 to Takyu, et al.

In producing electrophotographic color images, toner powders containing a high molecular weight polyester having a glass transition temperature of 50 to 100° C. and a weight average molecular weight of 30,000 to 100,000, preferably 55,000 to 65,000, have been utilized. Such molecular weights are well above the critical molecular weight for chain entanglement of that polyester. Although these high molecular weight polyesters are excellent at minimizing offset, they have undesirably high viscosities.

Instead of utilizing a single polyester, toners often employ polyester blends. Such polyester blends are disclosed in U.S. Pat. No. 3,965,021 to Clemens, et al., U.S. Pat. No. 4,795,689 to Matsubara, et al., U.S. Pat. No. 4,863,824 to Uchida, et al., Japanese Patent Application No. 56-065,146, Japanese Patent Application No. 62-299,859, Japanese Patent No. 1,015,755, and Japanese Patent Application No. 61-176,946.

High molecular weight polyesters with desirable offset properties but undesirable viscosities have been blended with a lower molecular weight form of the same polyester to improve the toner's viscosity and gloss properties. Generally, however, the lower molecular weight polyester has a molecular weight at or above the critical molecular weight for chain entanglement of that polymer. As a result, such low molecular weight polymers are still too high in viscosity to improve the viscosity and gloss properties of the blend over that of the high molecular polyester by itself.

SUMMARY OF THE INVENTION

The present invention relates to toner binders for producing electrophotographic color images in which the properties of a conventional high molecular weight polyester are improved by blending it with a miscible, low molecular weight polyester. Addition of the low molecular weight polyester reduces the melt viscosity of the toner binder at a given temperature. This permits use of lower fusing times and temperatures and, as a result, less power is needed to bind the toner particles to paper. Fusing temperature reduction has the added advantage of diminishing the possibility of clay-coated paper distortion and blistering.

Despite the reduction in viscosity, the elasticity of the toner binder particles of the present invention remains substantially as high as that achieved using only the high molecular weight polyester. This property gives the toner particles good melt cohesive strength so that substantially all toner remains adhered to the paper during fusing.

Further, toner powders made with the polymeric blends of this invention can be heat fused at speeds of about 10 inches per second on clay coated lithographic paper stock or the like using a heated silicone rubber coated fuser roll. Thus, these toner powders can be used at high speed to produce very high quality heat fused color images on such stock.

Use of the present invention's blend of toner binders not only results in processing advantages, but also yields product quality benefits. Specifically, incorporation of the low molecular weight polyester binder permits the toner particles to be ground to a finer size. When utilized, these fine toner particles produce high resolution images. The present invention also permits matching between the gloss of an image and that of the paper.

DETAILED DESCRIPTION OF THE INVENTION

For purposes of this application, the definitions set forth in the following paragraphs apply.

The term "particle size", as used herein, or the term "size", or "sized" as employed herein in reference to the term "particles", means the volume weighted diameter as measured by conventional diameter measuring devices, such as a Coulter Multisizer, sold by Coulter, Inc.

The term "glass transition temperature" or "$T_g$" as used herein means the temperature at which a polymer changes from a glassy state to a rubbery state. This temperature can be determined by differential thermal analysis as disclosed in "Techniques and Methods of Polymer Evaluation", Vol. 1, Marcel Dekker, Inc., N.Y. 1966.

The term "fusing temperature" as used herein means the temperature at which images of satisfactory quality can be produced on a fuser of a given confirmation. The degree of fusing is determined by the level of gloss on a Gardiner G-20 Glossmeter. This value should be equal to or greater than 5.

The term "melt viscosity" as used herein means the complex viscosity of a polymer measured at a particular melt temperature and a particular frequency of oscillation. Melt viscosity is measured on a Rheometrics Dynamic Analyzer.

The term "inherent viscosity" or "I.V." as used here means the logarithmic viscosity number defined in "Properties of Polymers" by D. W. Van Krevelen, Elsevier, North Holland, Inc. 1972.

The present invention relates to a polymer composition for use in a toner where the polymer composition comprises:

a high molecular weight polyester having a glass transition temperature of 50° to 100° C. and a weight average molecular weight of 30,000 to 100,000, preferably 55,000 to 65,000 and a low molecular weight polyester in linear, amorphous form defined by the formula:

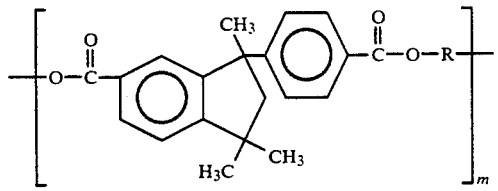

where low molecular weight polyester has a glass transition temperature of 55°–65° C., wherein:

R is a hydrocarbon radical having 2 to 5 carbons and
m is a number which gives the low molecular weight polyester a number average molecular weight of 500 to 2000.

It is particularly preferred for R to be an ethylene radical.

The high molecular weight polyester can be prepared from the reaction product of a wide variety of diols and dicarboxylic acids known to be useful in preparing polyester binders for toner particles.

Some specific examples of suitable diols are: 1,4-cyclohexanediol; b 1,4-cyclohexanedimethanol; 1,4-cyclohexanediethanol; 1,4-bis(2-hydroxyethoxy)cyclohexane; 1,4-benzenedimethanol; 1,4-benzenediethanol; norbornylene glycol; decahydro-2,6-naphthalenedimethanol; bisphenol A; ethylene glycol; diethylene glycol; triethylene glycol; 1,2-propanediol, 1,3-propanediol; 1,4-butanediol; 2,3-butanediol; 1,5-pentanediol; neopentyl glycol; 1,6-hexanediol; 1,7-heptanediol; 1,8-octanediol; 1,9-nonanediol; 1,10-decanediol; 1,12-dodecanediol; pentaerythritol; 2,24-trimethyl-1,6-hexanediol; and 4-oxa-2,6-heptanediol.

Suitable dicarboxylic acids include: succinic acid; sebacic acid; 2-methyladipic acid; diglycolic acid; thiodiglycolic acid; fumaric acid; adipic acid; cyclohexane-1,3-dicarboxylic acid; cyclohexane-1,4-dicarboxylic acid; cyclopentane-1,3-dicarboxylic acid; 2,5-norbornanedicarboxylic acid; phthalic acid; isophthalic acid; terephthalic acid; 2-butylisophthalic acid; 2,6-naphthalenedicarboxylic acid; 1,4-naphthalenedicarboxylic acid; 1,5-naphthalenedicarboxylic acid; 4,4'-sulfonyldibenzoic acid; 4,4'-oxydibenzoic acid; binaphthyldicarboxylic acid; and lower alkyl esters of the acids mentioned.

Polyfunctional compounds having three or more carboxyl groups, and three or more hydroxyl groups, are desirably employed to create branching in the polyester chain. Triols, tetraols, tricarboxylic acids, and functional equivalents, such as pentaerythritol, 1,3,5-trihydroxyl pentane, 1,5-dihydroxy-3-ethyl-3-(2-hydroxyethyl) pentane, trimethylolpropane, trimellitic anhydride, pyromellitic dianhydride, and the like are suitable branching agents. A presently preferred polyol is glycerol. Preferably, up to about 15 mole percent, preferably 5 mole percent, of the reactant monomers for producing the high molecular weight polyesters can be comprised of at least one polyol or polyacid.

Variations in the relative amounts of each of the respective monomer reactants are possible for optimizing the physical properties of the polymer.

The high molecular weight polyesters of this invention are conveniently prepared by any of the known polycondensation techniques, e.g., solution polycondensation or catalyzed melt-phase polycondensation. The high molecular weight polyesters also can be prepared by two-stage polyesterification procedures, such as those described in U.S. Pat. No. 4,140,644 and U.S. Pat. No. 4,217,400. The latter patent is particularly relevant, because it is directed to the control of branching in polyesterification. In such processes, the reactant glycols and carboxylic acids, are heated with a polyfunctional compound, such as a triol or carboxylic acid, and an esterification catalyst in an inert atmosphere at temperatures of 190° to 280° C., preferably 200° to 260° C. Subsequently, a vacuum is applied, while the reaction mixture temperature is maintained at 220° to 240° C., to increase the product's molecular weight.

The degree of polyesterification can be monitored by measuring the inherent viscosity of samples periodically taken from the reaction mixture. The reaction conditions used to prepare the high molecular weight polyesters should be selected to achieve an I.V. of 0.2 to 0.80 measured in methylene chloride solution at a concentration of 0.25 grams of polymer per 100 milliliters of solution. An I.V. of 0.30 to 0.60 is particularly desirable to insure that the high molecular weight polyester has a weight average molecular weight of 30,000 to 100,000, preferably 55,000 to 65,000, a branched structure, an amorphous form, a fusing temperature in the range of about 65° to about 200° C., and a $T_g$ in the range of about 50° to about 100° C. After reaching the desired inherent viscosity, the high molecular weight polyester is cooled and isolated.

One presently preferred class of the high molecular weight polyesters comprises residues derived from the polyesterification of a polymerizable monomer composition comprising:
  a dicarboxylic acid-derived component comprising:
    about 75 to 100 mole % of dimethyl terephthalate and
    about 0 to 25 mole % of dimethyl glutarate and
  a diol/polyol-derived component comprising:
    about 90 to 100 mole % of 1,2-propane diol and
    about 0 to 10 mole % of glycerol.

The low molecular weight polyesters of the present invention, like the above-described high molecular weight polyesters, are prepared by reacting dicarboxylic acids and diols. However, the reactants and reaction conditions are more particularized to produce a polyester, which when blended with the high molecular weight polyesters, achieves the above-described benefits. It is particularly important that no branching agent be used to prepare the low molecular weight polyester so that a linear, low molecular weight product is formed.

In the preferred embodiment, ethylene glycol is used as the diol and 1,1,3-trimethyl-3-(4-carboxyphenyl)-5-indane carboxylic acid is used as the dicarboxylic acid to produce a polyester of the following formula:

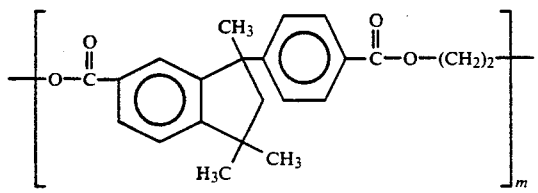

wherein: m is a number which gives the low molecular weight polyester a number average molecular weight of 500 to 2000.

The reaction process for producing the low molecular weight polyester is a modification of that used to make the high molecular weight polyester. The process conditions, however, are distinctly different, because the low molecular weight polymers are linear and have a low molecular weight, while the high molecular weight polymers are branched. For example in a catalytic polyesterification reaction, the reactants must be heated to a range of 190° to 250° C., preferably 220° to 240° C. Again, the degree of polyesterification can be monitored by measuring the inherent viscosity of samples periodically taken from the reaction mixture. To produce a polyester having a molecular weight of 500 to 2000 and a glass transition temperature of 55°-65° C., the polyesterification reaction should be allowed to continue until the reaction mixture has an I.V. of 0.02 to 0.05. A glass transition temperature of 55° to 65° C., preferably 60° C., is utilized to give the composition desirable flow and gloss properties.

To produce the low molecular weight polyester of the present invention, a reaction mixture having a composition of 100 mole % dicarboxylic acid and 100 mole % diol should theoretically be utilized. However, to control reaction conditions and stoichiometery, an excess of the diol is utilized. Typically, 100 to 130 mole %, preferably 100 to 110 mole %, of the diol reactant is employed.

Several different methods may be used to prepare the high Tg, low molecular weight polyester derived from ethylene glycol and 1,1-3-trimethyl-3-(4-carboxyphenyl)-5-indane carboxylic acid. One alternative is a typical melt polymerization process with only the reaction times being varied. This method provides an effective way to vary molecular weight. However, relatively small changes in reaction time can cause significant differences in molecular weights. A second method, which is less sensitive to reaction time, varies the initial reaction stoichiometry and carries out the ester-interchange reaction over a prolonged period. The application of vacuum, generally employed in typical melt polymerization reactions, is not required in this procedure. Although this second method is effective in varying molecular weight, it requires long reaction times. Alternatively, as a compromise between these two methods, the initial reaction stoichiometry can be modified and an end-capping reagent included in the typical melt polymerization process.

It is preferable also to include in the toner composition a charge control agent to control the extent and stability of tribolelectric charge. Suitable charge control agents for use in toners are disclosed, for example, in U.S. Pat. Nos. 3,893,935; 4,079,014; 4,323,634; and British Pat. Nos. 1,501,065 and 1,420,839. Charge control agents are generally employed in small quantities, such as 0.1 to 3 weight percent, preferably 0.2 to 1.5 weight percent, on a total toner powder weight basis.

Another optional but preferred starting material for inclusion in the polymer composition is a colorant in the form of a pigment or dye which imparts color to the electrophotographic image fused to paper. Suitable dyes and pigments are disclosed, for example, in U.S. Reissue Patent No. 31,072. Colorants are generally employed in quantities of 1 to 30 weight percent, preferably 1 to 8 weight percent, on a total toner powder weight basis.

Preferably, the low and high molecular weight polyesters are melt blended to form a polymer composition comprising:
  about 80 to about 20 weight percent of the high molecular weight polyester and
  about 20 to about 80 weight percent of the low molecular weight polyester.

As noted above, up to about 3 weight percent of a charge control agent and up to about 30 weight percent of a colorant may be melt blended into the polymer composition if desired. These materials are preferably in the form of finely divided solid particles which are mixed and then melt blended in accordance with conventional procedures. For example, melt blended can be accomplished using a roll mill or an extruder at temperatures of 100° to 240° C., preferably 120° to 180° C., in a period of 5 to 30 minutes.

After melt blended, the resulting polymer composition is cooled and then ground to produce toner particles. Grinding of the heat fused polymer composition can be carried out by any convenient procedure. For example, the solid bland can be crushed and then ground to a desired particle size using a fluid energy or jet mill, as described in U.S. Pat. No. 4,089,472. Conventional particle classification techniques are then used to achieve a toner particle composition having a desired size distribution.

Toner particles prepared from the polymer composition of the present invention preferably have a particle size of 2 to 25 microns, more preferably 5 to about 15 microns. Such particles have a fusing temperature of 340° to 380° F. on an externally heated silicone rubber fuser at 10 ips such that there is gloss level of about 5 on a Gardiner G-20 glossmeter. The polymer composition also has a $T_g$ of about 60° C.

The polymer composition of the present invention displays a melt viscosity at 150° C. and 1 rad/sec of 200 to 5000 poise. This low melt viscosity permits the toner powders of the present invention to be used for heat fusing color toned images to clay coated lithographic paper stock or the like using a silicone rubber coated heated fuser roll operating at speeds up to about 10 ips.

It has been discovered that when the low molecular weight polyester is blended with the high molecular weight polyester, a number of advantages result over use of only the latter. First, the melt viscosity of toner binders with a blend of these polyesters can be varied over a wide range of values. This characteristic permits suitably low melt viscosities which allow use of lower fusing times and temperatures and, as a result, less power is required to adhere the toner to paper.

When the high molecular weight polyesters are blended with low molecular weight polyesters, the same high level of elasticity achieved by use of the high molecular weight polyester alone is maintained. In view of its high elasticity, the toner binders of the present invention remain almost completely adhered to paper during fusion. As a result, the possibility of image offset is minimized.

A toner binder produced from a blend of the high molecular weight polyesters and the low molecular weight polyesters, in accordance with the present invention, is capable of being ground to a small size. As a result, an electrophotographic copy having an image of high resolution is produced.

Yet another benefit of the present invention is that the blend of high molecular weight and low molecular weight polyesters significantly diminishes the degree of distortion and blistering in coated paper copies compared to the use of toner binders containing only the high molecular weight polyesters.

EXAMPLES

Example 1

Preparation of Poly(ethylene 1,1,3-trimethyl-3-(4-carboxyphenyl)-5-indane carboxylate)

A mixture of 134.1 g (2.16 mol) of 1,1,3-trimethyl-3-(4-carboxyphenyl)-5-indane carboxylate dimethyl ester, and catalytic amounts of zinc acetate dihydrate and antimony (III) oxide was heated in a 1 liter polymer flask equipped with a mechanical stirrer, a Vigreaux-Claisen head, a nitrogen inlet, and a side arm according to the following schedule: 1 hour at 200° C. and 16 hours at 220° C. The polymer which resulted was cooled to room temperature, isolated, and analyzed. It was found to have an inherent viscosity of 0.04 and a glass transition temperature of 51° C.

Example 2

Preparation of High Molecular Weight Polyester Resin

A mixture of 330.1 g (1.70 mol) of dimethylterephthalate, 48.1 g (0.30 mol) of dimethylglutarate, 201.7 g (2.65 mol) of 1,2-propanediol, 9.21 g (0.10 mol) of glycerol, and catalytic amounts of zinc acetate dihydrate and antimony (III) oxide were heated in a 1 liter polymer flask equipped with a Vigreax-Claisen head, nitrogen inlet, and sealed side arm according to the following schedule:

2 hrs at 220° C.;
1 hr at 240° C.; and
1 hr at 240° C. with head removed

A metal blade stirrer was then introduced, and the mixture was stirred at 240° C. for 1.5 hrs. at 0.30 mm pressure. The polymer which resulted was then cooled, isolated, and analyzed. It was found to have an inherent viscosity of 0.41 and a glass transition temperature of 60° C.

Examples 3 to 7

Polyblends of the high molecular weight polyester of Example 2 and the low molecular weight polyester of Example 1 were prepared by conventional melt compounding techniques. Various ratios of the polyesters were blended with a two-roll mill at 100° to 130° C. for twenty minutes and then allowed to cool. The resulting compositions and their compounding and glass transition temperatures are shown below in Table 1.

TABLE 1

| Example | Ratio of High Molecular Weight Weight Polyester to Low Molecular Weight Polyester | Compounding Temperature (°C.) | Glass Transition Temperature (°C.) |
|---|---|---|---|
| 3 | 100/0 | 130 | 61.7 |
| 4 | 75/25 | 120 | 63.6 |
| 5 | 50/50 | 120 | 63.0 |
| 6 | 25/75 | 110 | 63.6 |
| 7 | 0/100 | 100 | 63.7 |

The toner property most useful in describing fusing performance is melt viscosity. In order to achieve high image quality, the toner surface must become glossy, and toner must flow together to eliminate air interfaces and light scatter. This requires as low a melt viscosity as possible. High speed fusing also requires low melt viscosity as does fusing on clay-coated paper without blistering. However, low melt viscosity can lead to toner offset onto fuser rolls and wraps and jams in the fuser. Higher melt elasticity in dynamic rheological measurements can be quantified by a value known as the loss tangent, or tan δ, which is the ratio of the viscous modulus to the elastic modulus. The lower the tan δ is, the higher the melt elasticity. Thus, a toner has desirable rheological properties when melt viscosity is low and tan δ is low. Table 2 below summarizes the rheological data for the polyester blends of Examples 3-7, as measured with a Rheometrics Dynamic Analyzer at 150° C. and a frequency of 1 rad/sec.

TABLE 2

| Sample | Melt Viscosity η (poise) | Tan δ |
|---|---|---|
| Example 3 | 4770 | 4.57 |
| Example 4 | 1850 | 5.03 |
| Example 5 | 986 | 5.12 |
| Example 6 | 323 | 5.20 |
| Example 7 | 58.5 | >50 | as shown in Table 2, polyester blends greatly lower melt viscosity, while at the same time suffering only a small increase in tan δ compared to the high molecular weight polyester resin itself.

Example 8
Preparation of Polyblend Toners

Toner materials were prepared by blending equal parts of the high molecular weight polyester of Example 2 and the low molecular weight polyester of Example 1 with charge control agent and colorant. This was done by adding 20g of the polyester of Example 2, 20g of the polyester of Example 1, 3.2g Bonadur Red pigment, and 0.25g of N,N-dimethyl-N-stearyl-N-benzylammonium meta-nitrobenzenesulfonate charge control agent to a two-roll mill with a roll temperature of 120° C.

The toner material was then coarse ground on a Wiley mill with a 2 mm screen. The coarse ground powder was then jet milled to toner particle size on a Trost model TX mill at a pressure of 70 psi and a 1 gm/min feed rate. The resulting particle size was 4.5 microns number median diameter and 6.7 microns volume median diameter as determined on a Coulter Counter.

Example 9
Fusing Performance of Toner Powder

The toner powder of Example 8 was subjected to a series of tests of fusing performance. Patches of about 1"×2" were prepared by an electrophotographic process, using a clay coated 80 lb lithographic paper stock. The toned samples were passed through a fuser assembly comprising a heated soft silicone rubber coated fuser roll and a hard fluoropolymer coated backup roll at a speed of either 10 or 20 inches per sec. The surface temperature of the fuser roll was maintained between 360° and 400° F., because temperatures greater than 410° F. blistered and distorted the clay coated paper.

When analyzed on a Gardiner G-20 glossmeter, the toner powder of Example 8 achieved the typical gloss levels of 8 to 10 at a temperature of 370° F. and a value of 22 at a temperature of 390° F. There were no offset failures. The toner powder based solely on the polyester of Example 2 could only attain the minimum G20 gloss value of 5 before reaching the blistering temperature of the clay coated paper.

The fusing data for the blended toner of Example 8 and a similar toner powder prepared form the polyester resin of Example 2 (a control toner), at various fusing temperatures, are summarized below in Table 3. For the toner prepared from the polymer blend (i.e., Example 8), the measured reflection density (i.e., $D_r$) reached a plateau maximum at a low temperature relative to the control toner. This allows fusing temperatures and dwell times to be reduced which results in lower powder consumption, lower paper distortion, and, as already indicated, prevention of coated paper stock blistering. The high flat density response offers improved image quality and fusing latitude.

TABLE 3

| | 360° F. | | 370° F. | | 380° F. | | 390° F. | |
|---|---|---|---|---|---|---|---|---|
| | $D_r$ | G20 | $D_r$ | G20 | $D_r$ | G20 | $D_r$ | G20 |
| Toner Powder of Example 8 | 2.1 | — | 2.2 | 8 | 2.2 | 18 | 2.2 | 22 |
| Control Toner | 1.3 | — | 1.4 | — | 1.6 | — | 1.8 | — |

(—) indicates that the G20 gloss level is lower than 5.

Although the invention has been described in detail for the purpose of illustration, it is understood that such detail is solely for that purpose, and variations can be made therein by those skilled in the art without departing from the spirit and the scope of the invention which is defined by the following claims.

We claim:

1. A polymer composition for use in a toner powder comprising:
   a high molecular weight polyester having a glass transition temperature of 50° to 100° C. and a weight average molecular weight of 30,000 to 100,000 and
   a low molecular weight polyester in linear, amorphous form defined by the formula:

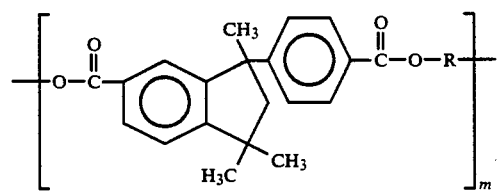

said low molecular weight polyester having a glass transition temperature of 55°-65° C., wherein:
   R is a hydrocarbon radical having 2 to 5 carbons and
   m is a number which gives said low molecular weight polyester a number average molecular weight of 500 to 2000.

2. A polymer composition according to claim 1, wherein said high molecular weight polyester is derived from the polyesterification of a polymerizable monomer composition comprising:
   a dicarboxylic acid-derived component comprising:
      75 to 100 mole percent of dimethyl terephthalate and
      0 to 25 mole percent of dimethyl glutarate and
   a diol-derived component comprising:
      90 to 100 mole percent of 1,2-propane diol and
      0 to 10 mole percent of glycerol.

3. A polymer composition according to claim 1, wherein R in said low molecular weight polyester is an ethylene radical.

4. A polymer composition according to claim 1, wherein said high molecular weight polyester contains a branching agent.

5. A polymer composition according to claim 1, wherein said low molecular weight polyester has a glass transition temperature of about 60° C.

6. A toner powder comprising:
   a polymer composition according to claim 1.

7. A toner powder according to claim 6, further comprising:
   1 to 30 weight percent of a dispersed colorant on a 100 weight percent total toner composition basis.

8. A toner powder according to claim 6, further comprising:
   0.1 to 3 weight percent of a dispersed charge control agent.

9. A toner powder according to claim 6 which comprises:
   (a) 1 to 30 weight percent of colorant;
   (b) 0.1 to 3 weight percent of charge control agent; and
   (c) 67 to 98.5 weight percent of the polymer composition.

10. A toner powder according to claim 6, wherein said powder has a particle size of 2 to 25 microns.

11. A toner powder according to claim 6, wherein R in said low molecular weight polyester is an ethylene radical.

12. A toner powder according to claim 6, wherein said polymer composition has a melt viscosity of 200 to 5000 poise.

13. A toner powder according to claim 6, wherein said high molecular weight polyester is derived from the polyesterification of a polymerizable monomer composition comprising:
a dicarboxylic acid-derived component comprising:
75 to 100 mole percent of dimethyl terephthalate and
0 to 25 mole percent of dimethyl glutarate and
a diol-derived component comprising:
90 to 100 mole percent of 1,2-propane diol and
0 to 10 mole percent of glycerol.

14. A polymer composition for use in a toner powder comprising:
a high molecular weight polyester having a glass transition temperature of 50° to 100° C. and a weight average molecular weight of 30,000 to 100,000 derived from the polyesterification of a polymerizable monomer composition comprising:
a dicarboxylic acid-derived component comprising:
75 to 100 mole percent of dimethyl terephthalate and
0 to 25 percent of dimethyl glutarate and
a diol-derived component comprising:
90 to 100 mole percent of 1,2- propane diol and
0 to 10 mole percent of glycerol and
a low molecular weight polyester in linear, amorphous form defined by the formula:

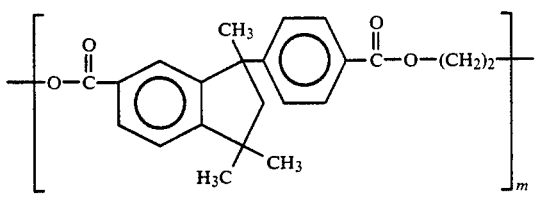

said low molecular weight polyester having a glass transition temperature of 55°-65° C., wherein:
m is a number which gives said low molecular weight polyester a number average molecular weight of 500 to 2000.

15. A polymer composition according to claim 14, wherein said high molecular weight polyester contains a branching agent.

16. A toner powder comprising:
a high molecular weight polyester, having a glass transition temperature of 50° to 100° C. and a weight average molecular weight of 30,000 to 100,000, derived from the polyesterification of a polymerizable monomer composition comprising:
a dicarboxylic acid-derived component comprising:
75 to 100 mole percent of dimethyl terephthalate and
0 to 25 mole percent of dimethyl glutarate and
a diol-derived component comprising:
90 to 100 mole percent of 1,2-propane diol and
0 to 10 mole percent of glycerol and
a low molecular weight polyester in linear, amorphous form defined by the formula:

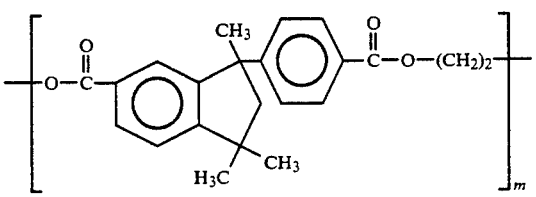

said low molecular weight polyester having a glass transition temperature of 55°-65° C., wherein:
m is a number which gives said low molecular weight polyester a number average molecular weight of 500 to 2000; and
a colorant.

17. A toner powder according to claim 16 further comprising:
0.1 to 3 weight percent of a dispersed charge control agent.

18. A toner powder according to claim 17 which comprises:
(a) 1 to 30 weight percent of colorant;
(b) 0.1 to 3 weight percent of charge control agent; and
(c) 67 to 98.5 weight percent of the blended high molecular weight and low molecular weight polyesters.

19. A toner powder according to claim 17, wherein said powder has a particle size of 2 to 25 microns.

20. A toner powder according to claim 17, wherein said polymer composition has a melt viscosity of 200 to 5000 poise.

* * * * *